ADAPTIVE DATA COMPACTOR

Filed July 17, 1962 3 Sheets-Sheet 1

INVENTORS
HERMAN BLASBALG
RICHARD VAN BLERKOM
BY Ronald J. Kransdorf
AGENT

United States Patent Office 3,237,170
Patented Feb. 22, 1966

3,237,170

ADAPTIVE DATA COMPACTOR

Herman Blasbalg, Baltimore, Md., and Richard Van Blerkom, Arlington, Va., assignors to International Business Machines Corporation, New York, N.Y., a corporation of New York Filed July 17, 1962, Ser. No. 210,372
12 Claims. (Cl. 340—172.5)

This invention relates to circuitry for reducing the number of bits required to represent a given sequence of data, and more particularly, to circuitry for performing this function when the statistics of the input data sequences are initially unknown.

A number of schemes have been proposed over the last few years for reducing the number of bits required to represent an input sequence. These schemes can be classified into two basic types: those which are information destroying (i.e., those in which it is decided that certain information in the message may be dispensed with and this information is permanently deleted from the data sequence) and those which are information preserving (i.e., those in which bits are eliminated from the data sequence for compaction purposes, but this elimination is done according to a coding scheme so that the original message, with all of its information content, may be subsequently reconstructed). The present invention is an information preserving scheme of data compaction.

Present information preserving schemes for data compaction have required that some knowledge of the statistics of the data to be compacted be initially available. Even schemes which have been broadly considered to be adaptive, have required that the circuit designer select several possible coding criteria for the compactor, each coding criterion assuming a different set of possible statistics for the input data, and design the circuit to recognize which of the predetermined statistics the occurring data sequence most nearly corresponds to. The compactor then selects the coding criterion associated with the recognized statistics. It can be readily seen that such a scheme would require that the circuit designer either have a fair knowledge of what the input statistics will be, or else assume an almost infinite number of input statistics and store the infinite number of suitable coding criteria required for each.

There are, however, many cases of practical interest where the statistics of the input data are initially unknown to the designer. In these situations, efficient coding is impossible at the present time and the entire message is transmitted.

It is, therefore, the primary object of this invention to provide a system for compacting data when the statistics of the input data are initially unknown.

In accordance with this object, this invention provides means for measuring the past statistics of the input data sequence and for using this information to generate a compaction code. The coding procedure could be continuously monitored to determine its efficiency and whether a change in code is required. It can be seen that, for this procedure to be efficient, the statistics of the input data must be quasi-stationary.

Hence, in order to code in a fully adaptive manner, it is essential to define a decision rule of adaptation which depends on past measurements and which will be useful for future measurements. As long as the decision rule is known at the transmitter and receiver and as long as it is defined on past measurements, the receiver will always know what coding criterion is being used at the transmitter.

From the above, it can be seen that a more specific object of this invention is to provide an adaptive data compactor which has no fixed coding criteria but which generates its own code in response to measurements and analysis of the statistics of the previous input sequences.

Another object of this invention is to provide a data compactor of the type mentioned above, which is capable of varying the coding criteria in response to variations in the statistics of the input data so as to always be operating in the near optimum coding mode.

In accordance with these objects, the general scheme of this invention employs analyzing means which are positioned to receive the sequences of input bits and to determine from these sequences the statistics thereof. A coding means is also provided for coding the present sequence to obtain an output having a lesser number of bits; the particular coding criterion being used in said coder at any given instant being generated by a separate means in response to the statistics determined by said analyzing means. Means are provided for inserting updated coding criteria into said coder either periodically or in response to a predetermined variation in the statistics of the output from said coding means.

In one embodiment of the invention, the analyzing means is a tree-type circuit which, for each possible M-bit input sequence, counts the number of times that each possible N-bit output sequence occurs following it. The most frequently occurring N-bit sequence is then inserted in a memory device and is used as a predictor for the next N-bit sequence following the given M-bit sequence.

In another embodiment of this invention, the analyzing means determines the probability of occurrence of each N bit sequence and arranges these sequences in order of probability. Then, either by multiple comparison or by table lookup, the Shannon-Fano coded character representing the particular bit sequence is generated. The variations in the statistics of the input data will cause variations in the Shannon-Fano coding of the bit sequences.

The foregoing and other objects, features and advantages of the invention will be apparent from the following more particular description of preferred embodiments of the invention, as illustrated in the accompanying drawings.

Figure 1:
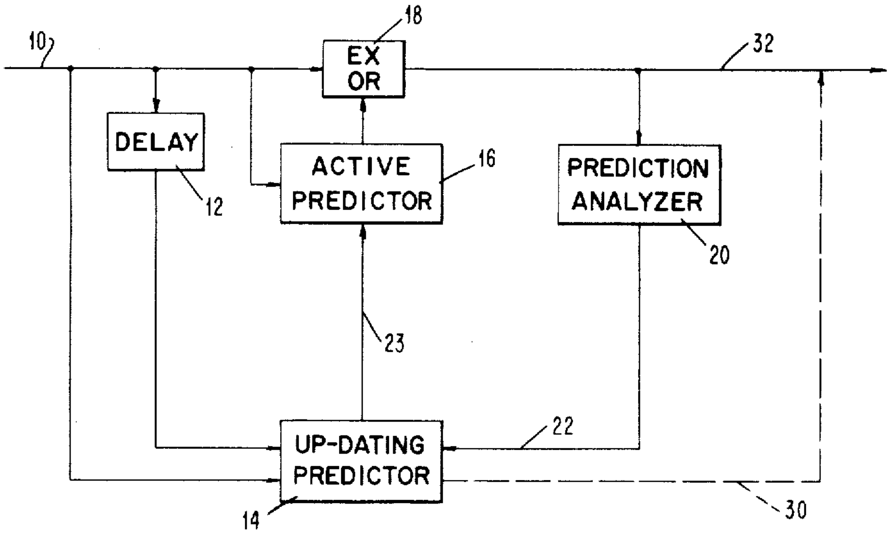
FIG. 1 is a generalized block diagram of one embodiment of this invention.

Referring now to FIG. 1, the broad concept of the invention is illustrated by a generalized block diagram of one embodiment of the invention. The input signals coming in on line 10 from a message source (not shown) are applied simultaneously to delay 12, to updating predictor 14, to active predictor 16, and to EXCLUSIVE OR gate 18. The output from delay 12 is applied to the other input of updating predictor 14. The updating predictor is a circuit which is capable of accepting each N-bit sequence coming in from line 10 and the preceding M-bit sequence applied to it by delay 12 and of using this data to determine the most likely N-bit sequence to follow each M-bit sequence. One suitable circuit for performing this function is shown and described with reference to FIG. 2. The active predictor 16 is a random access storage device which stores the most likely N-bit combination to follow each M-bit combination and applies the proper N-bit combination to the other input of EXCLUSIVE OR gate 18 at the conclusion of each M-bit sequence applied to it by line 10. The signals out of the EXCLUSIVE OR gate on line 32 could, for example, be run-length coded before being transmitted (i.e., a count could be kept of the number of ZEROS out of EXCLUSIVE OR gate 18 and this count transmitted, possibly along with a flag, when the EXCLUSIVE OR gate generates a ONE thus telling the receiver that the circuit has made an error in prediction for the present bit and how many bits have passed since the circuit made the last error in prediction).

A prediction analyzer 20 is connected to the output of EXCLUSIVE OR gate 18 and indicates the success of the compaction operation. If the prediction analyzer indicates that the efficiency of the compactor has dropped below a predetermined threshold, it will generate a signal on line 22, which will cause updating predictor 14 to apply new prediction values over line 23 to active predictor 16.

An output line 30 is also shown from the updating predictor to the circuit output line 32. The purpose of this line is to supply the new prediction values now being fed into the active predictor to the receiver so as to enable it to reconstruct the original data coming in on line 10 from the data ordinarily going out on line 32. However, as a practical matter, the receiver will have all of the information available at the transmitter and, by using a prediction analyzer and updating predictor, identical to those being used at the transmitter, will be able to generate its own active prediction table, which table will be identical with that being used at the transmitter. Therefore, the line 30 is not generally required and, for this reason, has been shown in dotted form. This line is not shown in FIG. 2.

Figure 2:
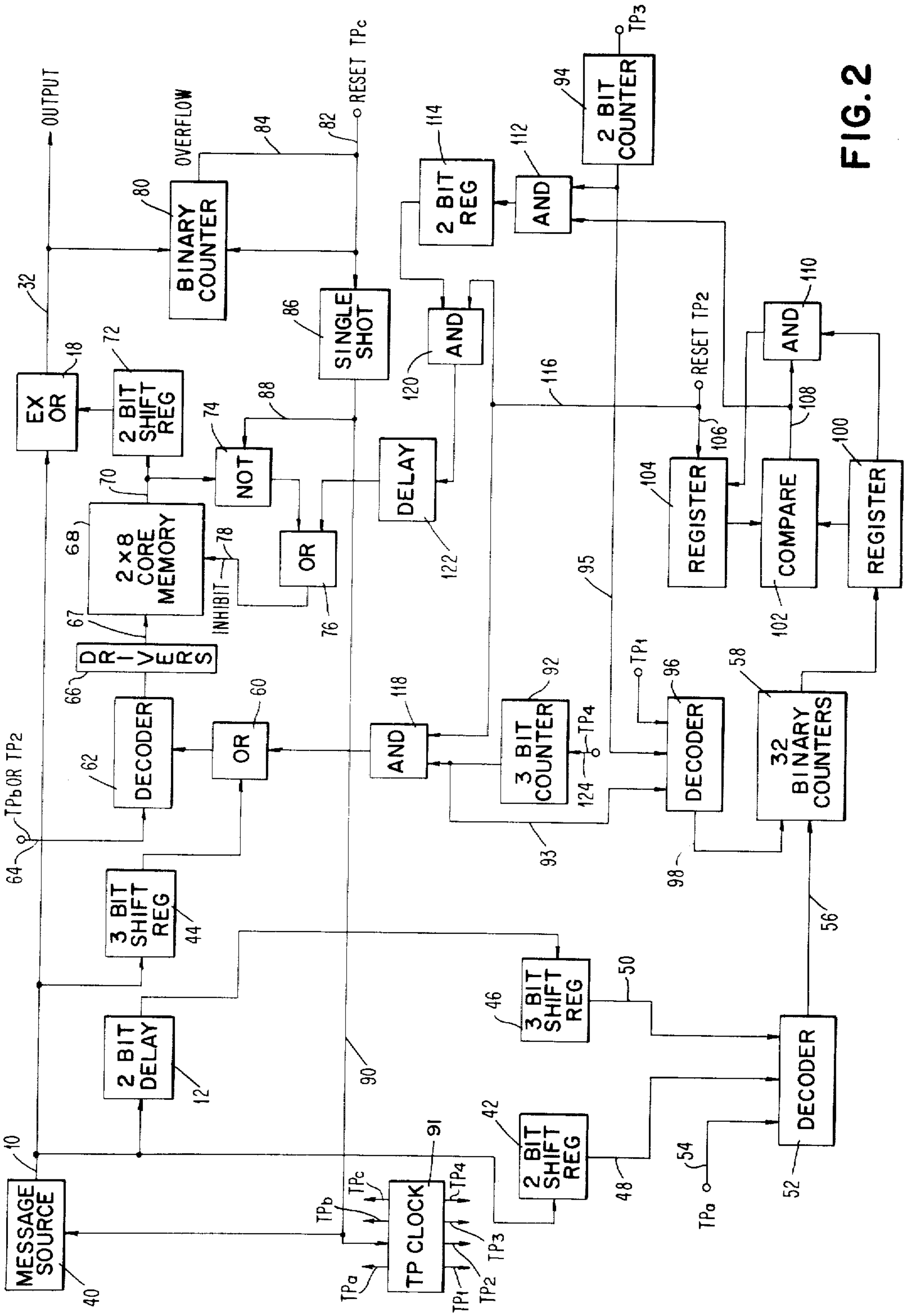
FIG. 2 is a more detailed block diagram of the embodiment of this invention shown in FIG. 1.

FIG. 2 is a more detailed block diagram of the adaptive compactor circuit shown in FIG. 1. For this circuit $M=3$ and $N=2$, or, in other words, this circuit will be predicting the most likely two-bit combination to follow each three-bit combination.

An input signal generated by message source 40 is applied simultaneously over line 10 to (a) two-bit shift register 42, (b) two-bit delay 12, (c) three-bit shift register 44, and (d) EXCLUSIVE OR gate 18. The output from delay 12 is applied to a three-bit shift register 46. It can be seen that, with this arrangement, at any given instant of time, the present M-bits are in register 46 and the present N-bits in register 42. The outputs from shift registers 42 and 46 are passed through lines 48 and 50 respectively to the inputs of decoder 52. Decoder 52 could be a core matrix the row input of which is for example determined by the M-bit combination in register 46 and the column input of which is determined by the N-bit combination in register 42 or it could merely be a bank of AND gates one for each of the 32 possible combinations of the binary bits in the two shift registers 42 and 46. After each shift of the shift registers 42 and 46, a timing pulse, TP*a*, is applied to line 54 (by, for example, clock 91) which, for example, could be connected to one input of each of the decoder AND gates, causing an output signal to appear on one of 32 decoder output lines 56. Each line 56 is connected to a different one of the 32 binary counters 58 and causes its associated counter to be stepped one position when a signal is applied thereto. The counters 58 are actually grouped into eight groups of four counters each and are used for recording the number of times that each particular two-bit combination of bits follows each of the three-bit combinations. These counters may, for example, be magnetic core ring counters of a well-known type. The counters 58 and the associated circuitry for loading and unloading them correspond generally to the updating predictor 14 shown in FIG. 1. The counts stored in these counters, in effect, indicate which two-bit combination is most likely to follow each of the three-bit combinations.

A problem exists with these counters when the capacity of a particular one of the counters is reached. This could be handled in any number of acceptable ways as, for example, by causing the four counters of a particular group to be set back to a predetermined percentage of their existing value, such as to one-half their existing values, when the capacity of one counter in the group is reached.

The number stored in shift register 44, which number is the present M-bit combination, is passed in parallel through OR gate 60 to decoder 62 which decoder may be of a form similar to that used for decoder 52. If such a decoder is used, each combination of bits in shift register 44 will cause a different one of the AND gates in decoder 62 to be conditioned. After every other bit, a timing pulse, TP*b*, is applied through line 64 to decoder 62. This pulse passes through the conditioned AND gate of decoder 62 to trigger one of eight drivers 66. Each driver 66 energizes a line 67 which passes through a different one of the eight rows of the core matrix memory 68. The memory 68 stores the most likely two-bit combination to follow each of the eight possible three-bit combinations and corresponds generally to the active predictor 16 of FIG. 1. A signal applied to a line 67 by an energized driver 66 causes a two-bit number stored in the associated memory address to be read out over line 70 to two-bit shift register 72. The number read into register 72 is the predicted N-bit combination for the M-bit combination in register 44. Since it will be desired to use the numbers stored in memory 68 again, the number read into shift register 72 is recirculated into memory through NOT gate 74, OR gate 76 and inhibit line 78. The drivers 66 are of a well-known type which cause first a signal of one polarity on the drive line and then a signal of the opposite polarity. The second signals in conjunction with the inhibit signals on line 78 cause the contents of memory 68 to be restored in a well-known manner.

The two bits read into shift register 72 are successively compared with the next two bits applied over line 10 to EXCLUSIVE OR gate 18 and an output signal generated on line 32 only where there is a failure of comparison. The signals on line 32 could, for example, be run-length coded before being transmitted. The binary counter 80 is stepped each time there is a failure of comparison. The counter is normally reset by a timing pulse, TP*c*, applied to reset line 82 at periodic intervals. This counter corresponds generally to the prediction analyzer 20 shown in FIG. 1. The time between TP*c* pulses and the capacity of counter 80 will combine to determine the mount of error which will be tolerated before an updating operation is performed.

Assuming that the permissible amount of error has been exceeded, the capacity of counter 80 will be exceeded and an over-flow signal will appear on line 84, which signal will trigger single-shot multivibrator 86. The signal out of single-shot multivibrator 86 will be applied over line 88 to NOT gate 74 to prevent the output from memory 68 from being read back into it and will also be applied over line 90 to temporarily stop the flow of information from message source 40 and to energize clock 91 to generate TP1–TP4 pulses rather than TP*a*–TP*c* pulses. At this time counters 92 and 94 will be set to a ZERO condition. These counters are connected to the input terminals of decoder 96 by lines 93 and 95, respectively. Decoder 96 could be a bank of AND gates identical to that used in decoder 52. When a TP1 pulse is applied to decoder 96 by clock 91, the decoder, having its first AND gate conditioned by the signals from counters 92 and 94, will cause an output signal to appear on the first of its 32 output lines 98. Each of these output lines passes through all the cores of a different counter 58 and causes the contents thereof to be read out into a register 100. The contents of register 100 are compared in compare circuit 102 with the contents of register 104. Register 104 would initially be set to zero by a TP2 pulse applied to line 106, there being one TP2 pulse after every seven comparisons in compare circuit 102. If the comparison shows that the contents of register 100 is greater than the contents of register 104 (as would be the case for the first comparison since register 104 initially contains ZERO) an output signal will appear on line 108 which will condition AND gate 110 to pass the contents of register 100 to register 104 and will condition AND gate 112 to pass the contents of counter 94 into two-bit register 114. After each comparison, a TP3 pulse is applied to counter 94 to step it one position. The second TP1 pulse, therefore, finds the second AND gate of decoder 96 conditioned and causes an output signal on the second output line 98 to cause the contents of the second counter 58 to be read into register 100. As was previously noted, the first four binary counters 58 record the number of times that each of the four possible combinations of two-bits occur following a three-bit sequence of ZEROS. Therefore, if the number now in register 100 is greater than the number now stored in register 104, it will mean that the two-bit combination represented by this count is more likely to occur than the two-bit combination represented by the count in register 104 after a three-bit sequence of ZEROS. For this reason, the contents of register 100 is again compared with the contents of register 104 and, if the contents of register 100 is greater than that of register 104, a signal is generated on line 108, conditioning AND gate 110 to pass the contents of register 100 into register 104, causing this count to be the new basis for comparison, and AND 112 to be conditioned, causing the combination of bits stored in counter 94 to be fed into register 114, this combination of bits being the most likely, of those so far investigated, to occur after a sequence of three zeros. This process is repeated for the remaining two possible bit combinations following a sequence of three zeros so that, after four comparisons, the combination of bits stored in register 114 is the combination of bits which has been determined to be the most likely combination following a sequence of three zeros. If it is found that the count for two of the bit combinations is the same and that this is the highest count, with the circuit described above, the first combination to be sampled will be the one which is considered the most likely to occur.

At this time, a TP2 pulse is applied to line 106 to reset register 104 to ZERO and to line 116 to condition AND gates 118 and 120. This pulse is also applied to line 64 to cause an output signal from decoder 62, which decoder is now conditioned by signals from counter 92 through AND gate 118 and OR gate 60 to cause the ZERO-position driver 66 to be energized, bringing the contents of the ZERO-position of memory 68 out onto line 70. During the write cycle of driver 66 and memory 68, the inhibit signal from line 70 is blocked by NOT gate 74 and the inhibit signal is instead provided by register 114 through conditioned AND gate 120, delay 122 and OR gate 76. The delay 122 is required since the TP2 pulse occurs at the beginning of the read cycle, whereas the inhibit signal is not required until the beginning of the write cycle.

Some time after the occurrence of the TP2 pulse, for example, during the write cycle mentioned above, timing pulse TP4 is applied over line 124 to counter 92 to step this counter one position. It can be seen that, at this time, counter 94 will have stepped through a complete cycle and be again set to ZERO. The circuit is, therefore, ready to start a compare cycle to determine which two-bit combination would most probably follow a three-bit combination of 001 and to write this three-bit combination into the second address of core memory 68. This process would be repeated for each of the other six possible three-bit combinations. Immediately after the last of the updating information is read into memory 68, the single-shot 86 returns to its normal condition, allowing message source 40 to again apply signals to input line 10 and clock 91 to generate TP*a*, TP*b* and TP*c* timing pulses. The coding and transmission of data will then proceed as previously indicated until counter 80 again indicates that the prediction table stored in memory 68 is no longer giving satisfactory results at which time another updating cycle will be initiated.

It can be seen that the circuit shown in FIG. 1 and again, in more detail, in FIG. 2 assumes no initial knowledge on the part of the circuit designer but, instead, allows the circuit to generate its own prediction table in response to the statistics of the input data.

Another interesting feature of this circuit is that, if it should be determined that the bit rate applied to the output line 32 is greater than the output circuit is capable of handling, a signal could be applied by the output circuit to line 90 to cause a predetermined degradation in the fidelity of the message applied to line 10. This could be accomplished by, for example, reducing the number of quantum levels of a digital signal derived from an analog signal applied to source 40 or by eliminating the least significant bit from the message on line 10. This procedure will subsequently be referred to as "fidelity control."

Figure 3:
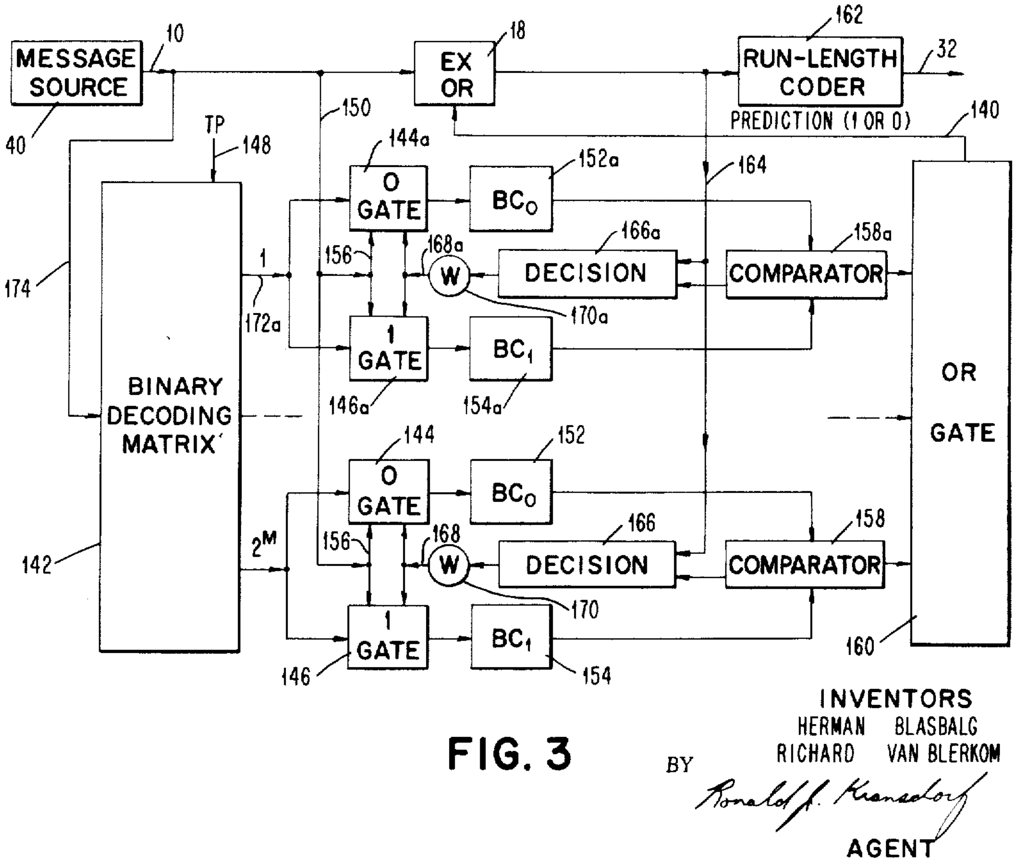
FIG. 3 is a block diagram of an embodiment of the invention of a type similar to that shown in FIG. 2.

FIG. 3 shows a circuit, which will hereinafter be referred to as an adaptive binary predictive compactor. This circuit is similar to that shown in FIG. 2 in that it uses the preceding M-bit sequence to predict the next N-bits, but, for this circuit, N is only one. Therefore, the prediction on prediction line 140 will always be either a ONE or a ZERO. For this circuit M could again be any value, for example, three.

Referring now to FIG. 3, it is seen that an input signal from message source 40 on input line 10 is applied simultaneously to binary decoding matrix 142, EXCLUSIVE OR gate 18, ZERO gates 144, and ONE gates 146. The binary decoding matrix 142 may, for example, be an M stage shift register, the outputs of which are connected to $2^M$ AND gates in such a way that, for each possible combination of ONES and ZEROS in the shift register, one and only one of the AND gates will be fully conditioned. During each bit time, a timing pulse is applied to line 148, which pulse passes through the conditioned AND gate of the decoding matrix 142 to condition the corresponding gates 144 and 146. The duration of this timing pulse is such that these gates remain conditioned for the entire bit time. The next input pulse on line 10 (in addition to being applied to decoder 142) passes through line 150 to be applied simultaneously to the input terminals of the conditioned gates 144 and 146. If a plus level is used to represent a ONE-bit and a minus level to represent a ZERO-bit, then the gates 144 and 146 can distinguish a ONE from a ZERO on line 150 on this basis and pass a pulse to the appropriate binary counter 152 or 154 to step the counter one position. If, on the other hand, a ONE-bit is represented by the presence of a signal and a ZERO-bit by the absence of a signal, a NOT gate would have to be placed at the point 156 in the line to allow the gates to distinguish between a ONE and a ZERO bit on line 150. A comparator 158 determines which of the binary counters 152 or 154 has a larger count therein and causes a ONE-bit to be applied to OR gate 160 if counter 154 for the preceding M-bit combination has a larger count therein or a ZERO-bit to be applied to OR gate 160 if the counter 152 for the preceding M-bit combination has a larger number stored therein. Comparator 158 may, for example, be a subtractor which subtracts the contents of binary counter 152 from the contents of binary counter 154 and gives a continuous indication of the difference. The sign bit of this stored difference could then be used to control gates which would cause a ONE-bit to be applied to OR gate 160 when a signal passed through gate 144 or 146, if the sign bit was positive, and a ZERO-bit to be applied to the OR gate if the sign bit was negative. Of course, if the absence of a bit was used to represent a ZERO-bit, only a single gate for applying a ONE-bit to the line, if the sign bit was positive, would be required.

The output from OR gate 160 is applied through prediction line 140 to the other input of EXCLUSIVE OR gate 18. The output from EXCLUSIVE OR gate 18 may be run-length coded in a conventional manner in run-length coder 162 to give the desired degre of data compaction.

A measure of updating is obtained by applying the output of EXCLUSIVE OR gate 18 through line 164 to decision unit 166. The sign bit stored in comparator 158 is also applied to the decision unit. The decision unit, may, for example, be an EXCLUSIVE OR gate with a branched output, one branch of which has a NOT gate therein. If the comparator indicates that a ONE was predicted and there is no signal on line 164, indicating that a ONE was the correct prediction, or, if the comparator indicates that a ZERO was predicted and there is a signal on line 164, indicating that a ZERO was an incorrect prediction, then a signal will appear on the first branch of the EXCLUSIVE OR gate output and pass through line 168 to be applied to still-conditioned ONE gate 146, causing binary counter 154 to be stepped one position. Likewise, if the comparator indicates that a ONE-bit was predicted and there is a signal on line 164 indicating that a ONE-bit was incorrect, or the comparator indicates that a ZERO was predicted and there is no signal on line 164 indicating that this was the correct prediction, a signal will pass from the NOT-branch output of the EXCLUSIVE OR gate over line 168 to still-conditioned zero gate 144, causing its counter to be stepped one position. Weighting circuits 170 are supplied in the lines 168 to allow a weighted signal to be applied to the counters, allowing them to be stepped less than one position, or several positions, in response to the signal on line 168, as the circuit designer may desire. As a practical matter, it might be preferred to use reversible counters for the counters 152 and 154 and to have the feedback signal on line 168 not only advance the counter for the bit that actually occurred but also cause the counter for the bit which did not occur to be stepped backwards a predetermined number of positions.

The operation of this circuit will be considered with reference to specific examples. Assume that M is three and that a sequence of 0001 has been applied to the shift register of the binary decoding matrix 142. Assume further that, at this time, the number stored in binary counter 154 of the first counter group is greater than the number stored in binary counter 152 of this group, meaning that, at this time, the circuit is indicating that, after a sequence of three zeros, a ONE-bit is more likely to occur than another ZERO.

After the three zero bits have been applied to the shift register of binary decoding matrix 142, the AND gate for the all-ZERO combination of these bits, the first AND gate, is conditioned. At this time, a timing pulse is applied to line 148, which timing pulse passes through line **172*a* to condition the zero gate and the one gate of the first set during the time that the ONE-bit is being applied to line 10. It will be noted that, during this time, the ONE-bit is being applied to the shift register of binary decoding matrix 152 and, if the register shifts, a different AND gate in the matrix will be conditioned. It is, of course, important that this not occur until after the timing pulse has terminated. Generally, the shifting time of the shift register will be such as to prevent this from occurring; however, a short delay might be inserted in the line 174** to eliminate any possibility of the shift register shifting too soon.

The ONE-bit coming in on line 10 is also applied through line 150 to conditioned gate **146*a*. The output from this gate is applied to binary counter 154*a* to step this counter one position, thereby improving the statistics as to the occurrence of a ONE-bit after a sequence of three ZEROS; and is also applied to the AND gate (or gates) in the comparator to cause a ONE-bit to be applied through OR gate 160 and prediction line 140 to the other input of EXCLUSIVE OR gate 18. Since a ONE-bit is also being applied over line 10 to the EXCLUSIVE OR gate, there will be no output from this gate and the counter in run-length coder 162 will be stepped one position. At this time, the decision unit 166*a* will have a ONE-bit applied to it by the comparator 158*a* and a ZERO applied to it over line 164. This will indicate that a ONE was predicted, that this prediction was correct, and that some weighted count should be added into counter 154*a*. Since the occurrence of a more recent event might be considered more significant than that in the past, this feedback signal might be given, for example, a weight of two in the weighting circuit 170*a*, causing the counter 154*a* to be stepped two or more positions rather than just one position by the signal applied to line 168*a***.

As a second example, assume the same facts as in the example above except that, after the sequence of three ZEROS, the next bit is also a ZERO. Here, the signal applied to line 150 would pass through gate **144*a* to cause counter 152*a* to be stepped one position, indicating a trend in the statistics after a sequence of three ZEROS towards the occurrence of another ZERO and a signal would be applied to the comparator, causing it, as before, to apply a ONE-bit through OR gate 160 and prediction line 140 to the other input of EXCLUSIVE OR gate 18. The comparator would still predict a ONE since the stored sign bit is a positive one, the fact that a ZERO bit has just been applied to the circuit having absolutely no effect on this. Since, at this time, a ZERO-bit is being applied by line 10 to the input of EXCLUSIVE OR gate 18, this gate will generate a bit on its output line, which will cause run-length coder 162 to generate an output on output line 32. This output will tell the receiver how many bits have passed through EXCLUSIVE OR gate 18 since the last error in prediction and that an error in prediction occurred for the bit now being passed. Since the receiver is generating predictions in the same manner as the transmitter, it will be able, from this data, to reconstruct the original bit sequence applied to line 10**.

The decision unit **166*a* will, at this time, have a ONE-bit applied to it by both line 164 and comparator 158*a*. This will, for example, cause an output on the NOT branch of the decision-unit EXCLUSIVE OR gate, which output will pass through weighting unit 170, line 168 and still-conditioned gate 144*a* to cause counter 152*a*** to be stepped by an amount determined by the weighting unit.

A problem exists with this circuit when the capacity of a counter 152 or 154 is reached. One solution to this problem would be to have an overflow bit from either of the counters of a given set cause both counters of the set to be stepped back a predetermined number of counts, or to be set back to a predetermined percentage of their existing value, such as, for example, to half of their existing value. If, as has been suggested earlier, a signal on line 168 causes the weighted value to be added into the proper counter and subtracted from the improper one, a counter, when reaching a boundary position (i.e., $n=0$, $n=n$), could be allowed to remain in that position until a wrong prediction was made, at which time, the weighted count would either be added or subtracted, as the case may be. For this special case, there is no gain in a correct decision but there is a loss for an incorrect decision. This result may not be unreasonable since this is a state of certainty and, hence, contributes no information. Other procedures than the two suggested above might also be employed at the boundary values.

Another problem exists when the counters 152 and 154 of a particular set are equal. For this special case, no real prediction can be made and a ONE or a ZERO could be predicted in a random manner. If, in the embodiment described above, a particular sign was attached to ZERO, the prediction would always be the same, depending on what sign was attached to the value.

The circuit shown in FIG. 3 could perhaps be simplified by using a single reversible counter for each channel, which counter is originally preset to a number $n/2$, where $n$ is the capacity of the counter. This counter woud be stepped forward by the application of a ONE-bit over line 150 and backwards by the application of a ZERO-bit over line 150. Similarly, this counter would be stepped forward by an output out of the NOT branch of the EXCLUSIVE OR gate in decision unit 166 and backwards by an output from the direct branch of this EXCLUSIVE OR gate. When the count in the counter was greater than $n/2$, a ONE would be predicted and, when it was less than $n/2$, a ZERO would be predicted. For the special case where the number was equal to $n/2$, a random selection of a ONE or a ZERO could be made for the prediction.

The two circuits which have been described in detail so far have employed the technique of prediction and comparison to obtain strings of ZEROS, which are then run-length coded prior to transmission. Adaptive techniques have been used to improve the prediction efficiency and, in this way, to improve the over-all coding efficiency. In the embodiments of the invention to be described now, a somewhat different technique of data compaction is employed.

The technique employed in this embodiment of the invention is described in a book by R. M. Fano, Transmission of Information, John Wiley and Sons, New York, N.Y., 1961. This technique operates in the following manner.

Assume that an input word is N-bits long. The probability of occurrence of each of the $2^N$ possible binary combinations of these N-bits is then determined and the combinations arranged in order of decreasing probability. The arrangement is then divided into two groups, each of which has an equal probability of occurrence; and each of these groups is likewise divided into two subgroups and so on until there is a unique subgroup for each of the binary combinations. For example, with $n=3$, an arrangement and grouping might be as follows:

TABLE 1

| | | | Bit Combination | Probability | Shannon-Fano Code |
|---|---|---|---|---|---|
| I | | | 000 | .35 | 00 |
| | | | 001 | .15 | 01 |
| II | 1 | | 010 | .15 | 100 |
| | | | 100 | .15 | 101 |
| | 2 | a | 011 | .06 | 1100 |
| | | | 101 | .06 | 1101 |
| | | b | 110 | .06 | 1110 |
| | | | 111 | .02 | 1111 |

It is noted from the above that the division is not always on an exactly equal probability basis but, as will be seen, this presents no real problem so long as the division is made on as equal a basis as is possible.

Using the three-bit table shown above, for the purpose of illustration, the code for each character would be generated in the following manner:

A three-bit sequence, for this example, $n=3$, coming in on the circuit input line is stored in some sort of a memory device and is compared in an EXCLUSIVE OR gate (comparison circuit) with the bit combinations in group I to determine if it is one of these combinations. If the input combination is one of the two combinations in group I, a ZERO will be generated by the comparison circuit and applied to the circuit output line; this ZERO will also be fed back to tell the circuit that the input combination is one of the two in group I. A second comparison will then be made to determine if the input combination is all ZEROS. If it is all ZEROS, a second ZERO will be applied to the circuit output line, thus uniquely identifying the three-bit input combination with a two-bit output combination. If the input bit combination is not found in the group in which it is being compared against, the comparison circuit will generate a ONE-bit to indicate this fact. This tells the circuit that the input combination of bits is in the other group and, if there is only one combination of bits in the other group, as there was after the second comparison above, this is sufficient information to uniquely identify the input bit combination; however, if there is more than one bit combination in the other group, the most likely subgroup of this group will be selected for the next comparison operation.

It can be seen that, if the procedure outlined above is followed for the bit combinations having the probabilities indicated in Table 1, the code shown in the third column of the table will be generated. At first glance, it would appear that this code actually results in data expansion rather than data compaction since only two of the three-bit combinations are represented by two-bit combinations, whereas four of the three-bit combinations are represented by four-bit combinations. However, when looking at the probabilities of occurrence, it is seen that the two three-bit sequences having two bits representing them in the code are 2.5 times more likely to occur than the four combinations having four-bits as their code. This technique, therefore, does give a very high level of data compaction.

However, it can also be seen that, if the statistics of the input data should change so that, for example, a sequence of three ONE-bits was as likely to occur, or, perhaps more likely to occur, than a sequence of three ZERO bits, this coding scheme could easily give data expansion rather than data compaction. It is, therefore, essential, when using this coding scheme, to know the probabilities of occurrence of the various bit combinations with a fairly high degree of accuracy. Where these probabilities are variable or where the probabilities of the input bit sequences are not initially known with any degree of accuracy, an adaptive scheme, such as those shown in accompanying FIGS. 4 and 5 becomes necessary.

Figure 4:
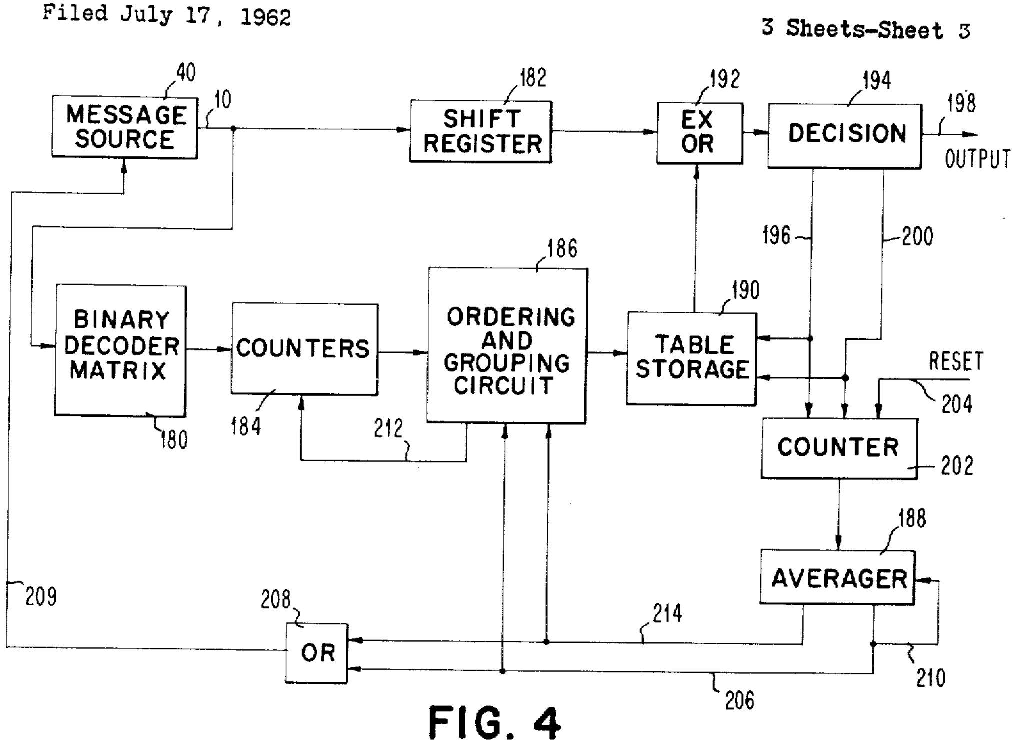
FIG. 4 is a block diagram of another embodiment of this invention.

In the circuit shown in FIG. 4, the message generated by message source 40 is applied over line 10 to binary decoding matrix 180 and shift register 182. Binary decoding matrix 180 is similar to those used in the preceding figures. If inputs are applied to it in parallel, that is, if the signals generated by message source 40 are in parallel rather than in series, the decoding matrix will merely be a bank of $2^N$ AND gates (where N is the number of parallel input bits), one and only one AND gate being conditioned by each combination of N input bits. If the N input bits from the message source are applied to the decoder matrix in series rather than in parallel, the matrix will include a shift register, the output from the shift register being used to condition the AND gates rather than having them be conditioned directly by the input. A bank of $2^N$ counters 184 are attached one to the output of each of the AND gates in the decoder matrix and are stepped in response to signals applied by the AND gates. An ordering and grouping circuit 186, acting in response to a command from an averager circuit 188, accepts the counts stored in the counters 184 and uses these counts as probability data to generate a table of data combinations, such as is shown in the first column of Table 1 above. This table is then stored in table-storage unit 190. The ordering and grouping circuit could be a small general purpose digital computer. This computer would require a memory unit for reasons which will become apparent later. The table storage could be a random access magnetic core memory.

Whether message source 40 applies the words in series or in parallel, at the end of each word, the shift register 182 will contain the entire word. This word is applied to one input of EXCLUSIVE OR gate 192. The other input to this gate is initially the group I combination of bits stored in table storage 190. If this comparison is successful, a ZERO will be applied to decision unit 194, indicating that the combination of bits stored in the shift register is one of the combinations in group I. The decision unit will send out a signal on line 196 telling the table storage to apply the bit combinations in subgroup 1 of group I to the EXCLUSIVE OR gate. The decision unit will also pass a ZERO out over output line 198. If the EXCLUSIVE OR gate 192 had indicated that the combination of bits stored in shift register 182 was not contained in group I, the ONE-bit on its output line would have caused decision unit 194 to generate a signal on line 200 telling the table storage to apply the combination of bits stored in subgroup I of group II to the EXCLUSIVE OR gate. In this situation, the decision unit would also pass a ONE-bit out over output line 198. The decision unit would continue to order successive comparisons in EXCLUSIVE OR gate 192 until the bit combination stored in shift register 182 had been uniquely determined and the Shannon-Fano code for this character passed out over line 198. The decision circuit 194 could be a small digital computer which was programmed to perform the desired functions. No memory would be required for this unit.

A counter 202 would record the number of comparisons required for each data word. This counter would be reset by a signal applied to line 204 after each word. An averager circuit 188 would receive the counts from counter 202 and would record the average number of comparisons necessary for each word. Any time this average exceeded a predetermined threshold, a signal would be applied to line 206, which would cause the newly determined probability represented by the counts in counters 184 to be applied to the memory section of ordering and grouping circuit 186. This circuit would then generate a new table based on these probabilities, and would cause this new table to be stored in table storage 190. The signal on line 206 would also pass through OR gate 208 to be applied to the message source 40 to stop the flow of input data until the table-updating operation was completed. The signal on line 206 would also be fed back over line 210 to reset the averager unit. The circuit 186 would also send out a signal over line 212 to reset the counters 184.

If, over a period of time, it is found that the table in the storage unit 190 is giving acceptable results, it might still be desired to improve this table by use of the new probabilities being generated in counters 184. This may be accomplished by having the averager unit 188 apply a signal at periodic intervals over line 214 to the ordering and grouping circuit 186. This signal would cause the counts stored in counters 184 to be added to those already recorded in the memory of circuit 186 and the probabilities indicated by this combined count would be used to generate a new prediction table to be stored in storage unit 190. The application of reset signals to lines 210 and 212 after this operation would be optional. The signal on line 214 would also be passed through OR gate 208 to stop the flow of information from message source 40 during the updating operation.

Figure 5:
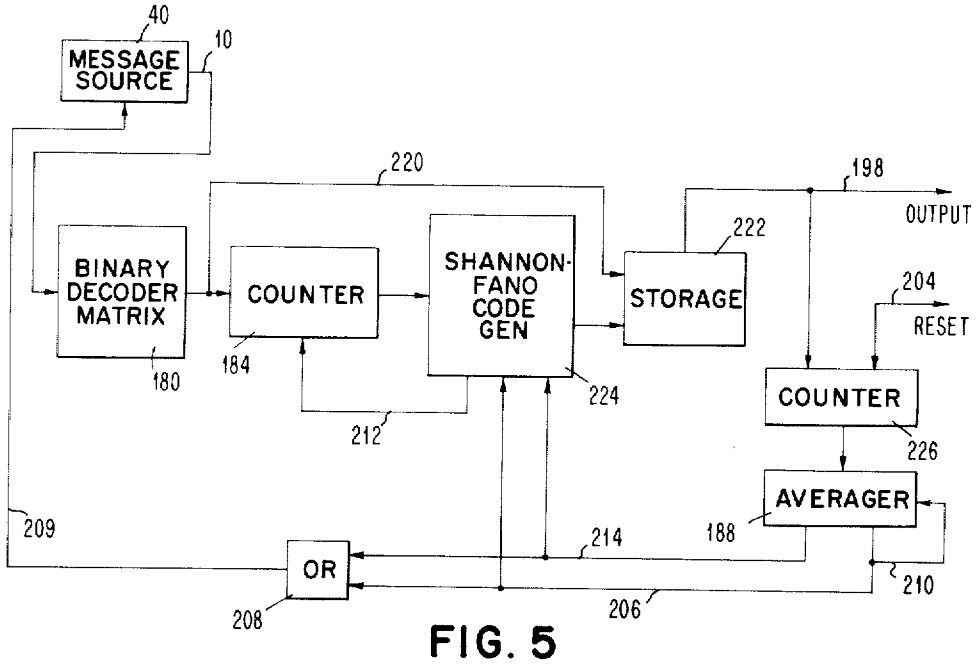
FIG. 5 is a block diagram of an embodiment of the invention of a type similar to that shown in FIG. 4.

FIG. 5 shows a circuit which is somewhat similar to that shown in FIG. 4. Here the signal from message source 40 is applied over line 10 to binary decoder matrix 180. This decoder matrix could be the same as that shown in FIG. 4. The output from binary decoder matrix 180 is applied to counters 184, which counters are the same and performed the same function as those shown in FIG. 4. The output from binary decoder matrix 180 is also applied over line 220 to a storage unit 222. The function of this line will be described later. The counts stored in counters 184 are applied under control of signals from averager circuit 188 to a Shannon-Fano code generator 224. This circuit uses the probability of occurrence of the various bit combinations as indicated by the counts in counters 184 to generate the Shannon-Fano code for each of the bit combinations. A sample code is shown in the third column of Table 1 above. This circuit could be a general purpose digital computer which has been programmed to perform the desired operation. A memory unit would be required for this computer, as will be seen later. The Shannon-Fano code generated for each character in circuit 224 is applied to storage unit 222. Storage unit 222 could, for example, be a random access magnetic core storage matrix having provision for nondestructive readout.

When the input signal on line 10 is applied to binary decoder matrix 180, it causes an output signal from one of the decoder AND gates, which is passed along a line 220 to cause a readout of the corresponding storage address in storage unit 222. This causes the Shannon-Fano coded character determined for the particular bit combination to be applied to circuit output line 198. The number of bits in each coded output word is counted by counter 226. This counter is reset by a signal applied to line 204 after each word. The counts from counter 226 are fed to an averager circuit 188, which determines the average number of bits in each coded output word and generates a signal on line 206 if this average exceeds a predetermined threshold. A signal from line 206 causes a new set of probabilities as indicated by the counts in counters 184 to be applied to the storage unit of the Shannon-Fano code generator circuit 224. The circuit 224 uses this probability information to generate a new Shannon-Fano code for the bit combinations, which new code is then stored in storage unit 222. The signal on line 206 is passed through OR gate 208 to stop the flow of information from memory source 40 during the code-updating operation. The signal on line 206 is also applied through line 210 to reset averager circuit 188. Circuit 224 sends out a signal over line 212 at the end of the updating operation to reset counters 184.

As with the embodiment shown in FIG. 4, if, even though the code in storage unit 222 is giving acceptable results, it is desired to improve the statistics thereof, the averager circuit 188 could be caused to generate a signal over line 214, which would cause the counts stored in counters 184 to be added to the counts stored in the memory of the circuit 224. These combined counts could then be used to indicate the probability of occurrence of the various bit combinations as the circuit 224 generated a new Shannon-Fano code to be stored in storage unit 222.

It should be noted that line 209 in FIGS. 4 and 5 could also be used for "fidelity control" if the bit rate on line 198 should exceed the capacity of the output circuit.

In the circuits shown in FIGS. 4 and 5, there is shown only one table which is used for all input bit combinations. A higher level of data compaction could be obtained if, for example in FIG. 5, a circuit similar to that shown in FIG. 2 was used to count the number of times each N-bit, three-bit in this example, combination followed each M-bit, three-bit in this example, combination. This information could then be used by one or more code generators 224 to generate a separate Shannon-Fano code table for each M-bit combination. These tables would be stored in eight separate storage units 222, the proper storage unit to be accessed for any N-bit combination being determined by the preceding M-bit combination.

In all the embodiments described so far, the transmission of data has been stopped during updating operations. But, where the message source 40 is generating data on a real-time basis, this is not a practical procedure. A possible alternative procedure which would eliminate this problem would be to use two active predictors, 16 or 68 or two storage units, 190 or 222. One of these units would be used in the circuit at any given time, and the other would be updated. If it were determined that the unit being used was not giving satisfactory results, the circuit could switch the updated unit into use and start updating the unit which was switched out of use.

So far, the discussion has also been limited to the transmitter end of the data compactor. The receivers will, in most ways, resemble the transmitters. Prior to the start of the transmission of compacted data, an initial set of data will be sent to the receiver in uncompacted form and stored there. The receiver will then have all the data which is present at the transmitter and, by use of the same circuitry described above with reference to the transmitter, will be able to generate the coding criteria which is used there. With the circuits shown in FIGS. 2 and 3, the receiver will know that, until it receives a signal, all of its predicted values are correct; and, when it receives a signal, the predicted value at that time is incorrect. In this way, it can reconstruct the original data generated by message source 40. In the embodiments shown in FIGS. 4 and 5, the receiver will have the same probability data which is present at the transmitter and will be able to generate its own Shannon-Fano code table. It will, therefore, be able to recognize each word generated by message source 40 by the transmitted Shannon-Fano coded word for it. It might appear that, since the Shannon-Fano coded bits are of variable length, some flag signal might be required between them to indicate the end of one word and the beginning of the next, but, as indicated in the previously mentioned book of Mr. Fano, the receiver can distinguish the end of one word and the beginning of the next because of the "prefix properties" of the code.

In the circuits shown so far, only one stage of adaptive data compaction has been employed. If it is desired to get a higher degree of data compaction than can be obtained in this manner, two or more adaptive stages may be cascaded, or adaptive stages may be cascaded with non-adaptive stages.

It may also be found that, where the message source is applying bits in parallel to the compactor, a single compactor may not be able to operate rapidly enough to handle the bit rate. In this case, a separate data compactor might be attached to the output line for each of the parallel bits and the outputs from the compactors then be multiplexed before being transmitted. This scheme would have the added advantage that, since the statistics of each of the parallel bits might differ, an optimum coding scheme might be used for each individually rather than using a coding criteria which would be optimum only for the average of all of these parallel bits.

While the invention has been particularly shown and described with reference to preferred embodiments thereof, it will be understood by those skilled in the art that the foregoing and other changes in form and details may be made therein without departing from the spirit and scope of the invention.

We claim:

1. A circuit for reducing the number of binary output bits required to represent sequences of binary input bits comprising in combination:

analyzing means for receiving said sequences of binary input bits, said analyzing means being adapted to determine the respective sequential occurrences of binary ONES and ZEROES in said input sequences and to generate signals indicative of said occurrences;

coding means responsive to said generated signals for generating coding signals to code said input sequences;

means for inserting said coding signals into said coding means to generate a reduced number of bits representative of said input bit sequences.

2. The circuit as described in claim 1 above characterized by said inserting means including means operable in response to predetermined variations in the occurrences of binary ONES and ZEROES generated by said analyzing means for controlling the insertion of said coding signals into said coding means.

3. A circuit of the type described in claim 1 above characterized by the inclusion of means responsive to an excess number of output bits for controlling the fidelity of the input bit sequences.

4. The circuit as described in claim 1 above characterized by said coding means including an EXCLUSIVE OR gate, means for applying said sequences to said EXCLUSIVE OR gate;

a random access memory in which is stored the most probable N-bit sequence to follow each M-bit sequence, and means for applying the proper N-bit sequence to the other input of said EXCLUSIVE OR gate after each M-bit sequence.

5. The circuit as described in claim 4 above characterized by:

said analyzing means including $2^N$ counters for each of the $2^M$ possible M-bit combinations, and decoder means for determining which N-bit sequence follows each of the M-bit sequences and for generating a signal on the appropriate output line to step the associated counter.

6. The circuit as described in claim 1 above characterized by said analyzing means including means for determining the probability of occurrence of each binary sequence;

by said code generating means including means for arranging said sequences in order of decreasing probability of occurrence and for grouping the sequences, as so arranged, into equal-probability-of-occurrence groups and subgroups;

and by said coding means including means for comparing an input sequence with the sequences in a first group, for generating a bit if there is an unsuccessful comparison, and for repeating the comparison with successive subgroups until the input sequence is uniquely identified.

7. An adaptive circuit for reducing the number of binary output bits required to represent a sequence of binary input bits by predicting the next N-bit combination to follow any M-bit combination comprising:

an EXCLUSIVE OR gate to one input of which the sequence of binary input bits is applied;

a memory in which the most likely N-bit combination to follow each of the M-bit combinations is stored;

means for detecting the occurrence of an M-bit combination and for causing the corresponding N-bit sequence stored in said memory to be applied to the other input of said EXCLUSIVE OR gate in synchronism with the application of the next N-bits of the sequence to said one input;

decoder means for detecting which N-bit combination actually follows each of the M-bit combinations in the sequence and for generating an output on the appropriate one of $2^{MN}$ output lines, $2^{MN}$ counters, one connected to each of said output lines and adapted to be stepped in response to a signal applied thereto;

means for monitoring the output from said EXCLUSIVE OR gate and for generating an updating signal if there were detected a predetermined number of ONE bits during a predetermined time interval;

and means responsive to said updating signal for causing the most likely N-bit combination to follow each M-bit combination, as determined in said counters, to be applied to said memory in place of the information presently stored therein.

8. A circuit for reducing the number of binary bits required to represent a binary bit sequence by predicting the most likely bit following each M-bit sequence comprising:

decoder means for determining which of the possible $2^M$ combinations of the M-bits has occurred;

$2^M$ first counter means, $2^M$ second counter means, means responsive to the detection of an M-bit combination by said decoder means for stepping the first counter means associated with the bit combination if the next bit is a ONE and for stepping the corresponding second counter means if the next bit is a ZERO.

an EXCLUSIVE OR gate to which each bit of the sequence is applied;

a comparison circuit for each of the possible $2^M$ bit combinations, each of said comparison circuits being responsive to the occurrence of its associated bit combination for causing a ONE bit to be applied as a prediction value to the other input of the EXCLUSIVE OR gate if the corresponding first counter means has the larger number stored therein and a ZERO bit to be applied as a prediction value if the corresponding second counter means has the larger number stored therein.

9. A circuit of the type described in claim 8 above characterized by the inclusion of:
  updating means for determining if the bit following the M-bit sequence is a ONE or a ZERO and for stepping the associated first counter means if this bit is a ONE and for stepping the associated second counter means if this bit is a ZERO.

10. A circuit as described in claim 9 above characterized by:
  said updating means including means for applying a weighted signal to the counter to be stepped whereby the counter will be stepped several bit positions.

11. A circuit for adaptively Shannon-Fano coding a sequence of N-bit binary input words comprising:
  means for Shannon-Fano coding said sequence;
  means for determining the relative frequency of occurrence of the $2^N$ possible N-bit words;
  means for determining the efficiency of said Shannon-Fano coding means and for generating an output signal when said efficiency drops below a predetermined threshold;
  and code generating means operable in response to said signal for utilizing the probability data contained in said frequency determining means for generating a new Shannon-Fano code and for applying this code to said Shannon-Fano coding means.

12. A circuit for adaptively Shannon-Fano coding a sequence of N-bit binary input words comprising:
  means for Shannon-Fano coding said sequence;
  means for determining the relative frequency of occurrence of the $2^N$ possible N-bit words;

means for determining the efficiency of said Shannon-Fano coding means, means responsive to an indication from said efficiency determining means that the frequency has dropped below a predetermined threshold for generating a first signal and to an indication that the efficiency has remained above the predetermined threshold for a predetermined period of time for generating a second signal;
  code generating means having storage means therein, and means operable in response to said first signal for causing the probability data determined by said frequency determining means to be applied to the storage means of said code generating means, and responsive to said second signal for causing said probability data to be added to the probability data already stored in said storage means, said code generating means being adapted to utilize the probability data in its storage means to generate a new Shannon-Fano code and to apply this code to said Shannon-Fano coding means.

References Cited by the Examiner

Pages 88–96, March, 1961—Filipowski et al., Digital Data Transmission Systems of the Future, IRE Transactions on Communications.

ROBERT C. BAILEY, *Primary Examiner.*

MALCOLM A. MORRISON, *Examiner.*

W. M. BECKER, *Assistant Examiner.*